United States Patent
Ma

(10) Patent No.: US 10,990,312 B2
(45) Date of Patent: Apr. 27, 2021

(54) METHOD, APPARATUS, DEVICE AND STORAGE MEDIUM FOR PROCESSING DATA LOCATION OF STORAGE DEVICE

(71) Applicant: BEIJING BAIDU NETCOM SCIENCE TECHNOLOGY CO., LTD., Beijing (CN)

(72) Inventor: Jingwei Ma, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 98 days.

(21) Appl. No.: 16/456,454

(22) Filed: Jun. 28, 2019

(65) Prior Publication Data
US 2019/0317686 A1 Oct. 17, 2019

(30) Foreign Application Priority Data
Jul. 16, 2018 (CN) .......................... 201810779464.5

(51) Int. Cl.
*G06F 3/06* (2006.01)
*G06F 11/34* (2006.01)

(52) U.S. Cl.
CPC .......... *G06F 3/0644* (2013.01); *G06F 3/0604* (2013.01); *G06F 3/0673* (2013.01); *G06F 11/3438* (2013.01)

(58) Field of Classification Search
CPC ...... G06F 16/11; G06F 16/128; G06F 3/0644; G06F 3/0604; G06F 11/1451; G06F 11/1469; G06F 11/1435
See application file for complete search history.

(56) References Cited

U.S. PATENT DOCUMENTS 6,983,295 B1 1/2006 Hart
7,529,782 B2 * 5/2009 Prahlad ............... G06F 11/1435
(Continued)

FOREIGN PATENT DOCUMENTS

CN 102184145 A 9/2011
CN 102239480 A 11/2011
(Continued)

OTHER PUBLICATIONS

P. Bohannon, R. Rastogi, S. Seshadri, A. Silberschatz and S. Sudarshan, "Detection and recovery techniques for database corruption," in IEEE Transactions on Knowledge and Data Engineering, vol. 15, No. 5, pp. 1120-1136, Sep.-Oct. 2003, doi: 10.1109/TKDE.2003.1232268. (Year: 2003).*

(Continued)

*Primary Examiner* — Khoa D Doan
(74) *Attorney, Agent, or Firm* — Dilworth IP, LLC

(57) ABSTRACT

A method, an apparatus, a device, and a storage medium for processing a data location of a storage device. The method includes: when a device is restarted, writing a first location information set of historical data stored in the storage device into a memory, where the historical data and location information corresponding to the historical data are stored in the storage device correspondingly; if there is update data in the storage device, writing location information of the update data stored corresponding to the update data in the storage device into the memory; and generating, according to the first location information set and the location information of the update data, a second location information set in the memory, and storing the second location information into the storage device.

20 Claims, 3 Drawing Sheets

(56) References Cited

U.S. PATENT DOCUMENTS

| | | | | |
|---|---|---|---|---|
| 2007/0266053 | A1* | 11/2007 | Ahal | H04L 67/1097 |
| 2010/0138591 | A1* | 6/2010 | Yano | G11C 16/20 |
| | | | | 711/103 |
| 2010/0153620 | A1* | 6/2010 | McKean | G06F 11/1466 |
| | | | | 711/103 |
| 2010/0205353 | A1* | 8/2010 | Miyamoto | G06F 12/0246 |
| | | | | 711/103 |
| 2012/0054152 | A1* | 3/2012 | Adkins | G06F 16/2365 |
| | | | | 707/623 |
| 2014/0089264 | A1* | 3/2014 | Talagala | G06F 3/0616 |
| | | | | 707/649 |
| 2015/0261463 | A1* | 9/2015 | Chakrabarti | G06F 11/1438 |
| | | | | 711/103 |

FOREIGN PATENT DOCUMENTS

| | | |
|---|---|---|
| CN | 103514260 A | 1/2014 |
| CN | 107665255 A | 2/2018 |
| JP | H1049418 A | 2/1998 |
| JP | 2004062759 A | 2/2004 |
| JP | 2007200114 A | 8/2007 |
| JP | 2008033967 A | 2/2008 |

OTHER PUBLICATIONS

Jingyu Zhou, Caijie Zhang, Hong Tang, Jiesheng Wu and T. Yang, "Programming support and adaptive checkpointing for high-throughput data services with log-based recovery," 2010 IEEE/IFIP International Conference on Dependable Systems & Networks (DSN), Chicago, IL, USA, 2010, pp. 91-100 (Year: 2010).*

First Office Action in CN Patent Application No. 201810779464.5 dated Dec. 21, 2020.

Sato, K. et al., The Design and Implementation of the NILFS Log-Structured File System, Information Processing Society of Japan, Computer System Symposium, 2008, pp. 1-13.

First Office Action of JP Patent Application No. 2019128721 dated Sep. 29, 2020.

* cited by examiner

METHOD, APPARATUS, DEVICE AND STORAGE MEDIUM FOR PROCESSING DATA LOCATION OF STORAGE DEVICE

CROSS-REFERENCE TO RELATED APPLICATIONS

This application claims priority to Chinese Patent Application No. 201810779464.5, filed on Jul. 16, 2018, which is hereby incorporated by reference in its entirety.

FIELD

The present disclosure relates to the field of storage technologies, and in particular, to a method, an apparatus, a device, and a storage medium for processing a data location of a storage device.

BACKGROUND

Space management is an important content of a storage system. In conventional space management method, a storage area in the storage system is specially divided so as to store space allocation information. A change of a spatial mapping relationship will change the space allocation information in this block area.

The existing space management method introduces random writes, which additionally increases the IO of the storage system, resulting in a degraded overall throughput of the storage system, and having an impact on the processing performance of the storage system.

Therefore, how to effectively manage a storage space becomes a technical problem that needs to be urgently solved.

SUMMARY

The present disclosure provides a method, an apparatus, a device, and a storage medium for processing a data location of a storage device to solve the defects that low processing performance, etc., in the prior art.

A first aspect of the present disclosure provides a method for processing a data location of a storage device, including:

when a device is restarted, writing a first location information set of historical data stored in the storage device into a memory, where the historical data and location information corresponding to the historical data are stored in the storage device correspondingly, and the first location information set is used to represent a set of data location information;

if there is update data in the storage device, writing location information of the update data stored corresponding to the update data in the storage device into the memory; and generating, according to the first location information set and the location information of the update data, a second location information set in the memory, and storing the second location information into the storage device.

A second aspect of the present disclosure provides an apparatus for processing a data location of a storage device, including:

a first processing module, configured to: when a device is restarted, write a first location information set of historical data stored in the storage device into a memory, where the historical data and location information corresponding to the historical data are stored in the storage device correspondingly, and the first location information set is used to represent a set of data location information;

a second processing module, configured to: if there is update data in the storage device, write location information of the update data stored corresponding to the update data in the storage device into the memory; and a generating module, configured to generate, according to the first location information set and the location information of the update data, a second location information set in the memory, and store the second location information into the storage device.

A third aspect of the present disclosure provides a computer device, including: at least one processor and a memory;

the memory stores a computer program; the at least one processor executes the computer program stored in the memory to implement the method provided by the first aspect.

A fourth aspect of the present disclosure provides a computer readable storage medium, where the computer readable storage medium stores a computer program that, when the computer program being executed, implements the method provided by the first aspect.

According to the method, apparatus, device and storage medium for processing a data location of a storage device of the present embodiment, when a device is restarted, a first location information set of historical data stored in the storage device is write into a memory; if there is updated data in the storage device, location information of the updated data stored corresponding to the update data in the storage device is written into the memory; and a second location information set is generated in the memory according to the first location information set and the location information of the update data, and is stored in the storage device. By combining the first location information of the historical data and the location information of the update data obtained from the log, the complete location information can be constructed in the memory at a fast speed, thereby not only ensuring the integrity of space allocation information, but also improving restating speed on the basis of reducing IOs. By correspondingly storing the historical data and its corresponding location information in the storage device together, that is, the space allocation information is written into the log together with the user data for storage, thereby effectively reducing the number of IOs, and solving the problem in the prior art that a separated storing of space allocation information and user data tends to introduce additional IOs, thereby decreasing the performance of a storage system.

BRIEF DESCRIPTION OF THE DRAWINGS

In order to illustrate technical solutions in embodiments of the present disclosure or in the prior art clearly, drawings that are used in the description of the embodiments or the prior art are introduced briefly in the following. It is apparent that the drawings described following are some of the embodiments of the present disclosure, and those skilled in the art can obtain other drawings according to these drawings on the premise of not paying creative labor.

Figure 1:
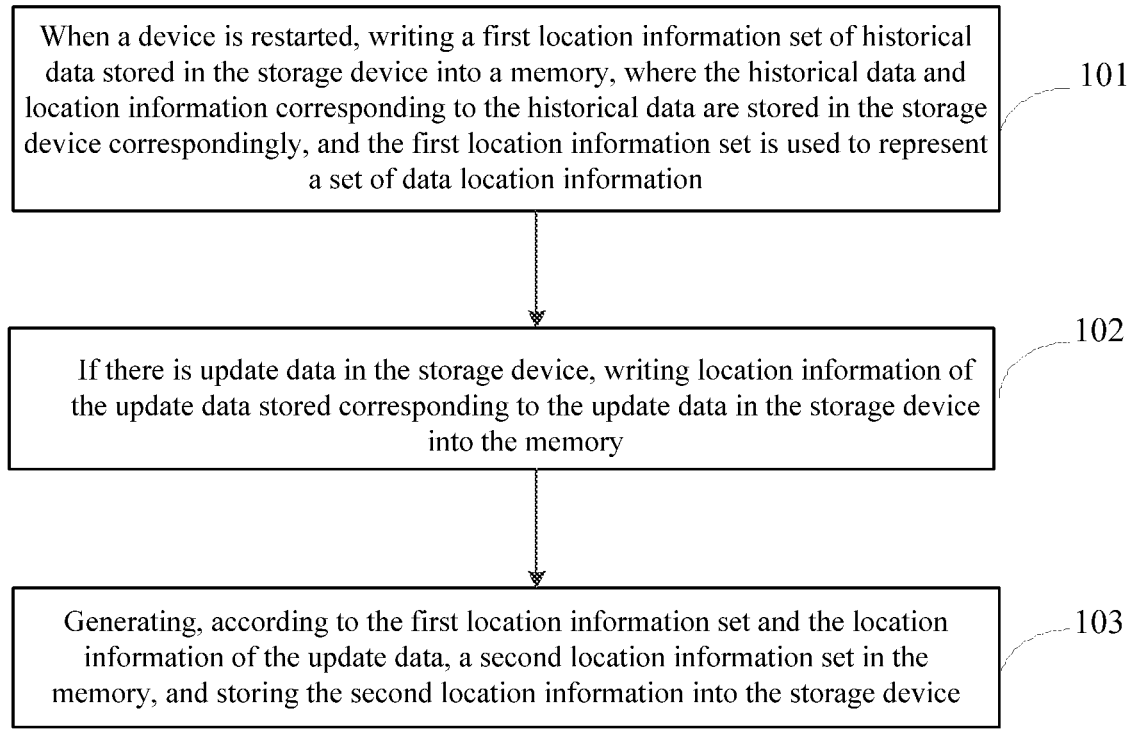
FIG. 1 is a schematic flowchart of a method for processing a data location of a storage device provided by an embodiment of the present disclosure.

Specific embodiments of the present disclosure have been shown by the drawings mentioned above, which will be described in more detail hereinafter. The drawings and the descriptive text are not intended to limit the scope of the present disclosure in any way, but to illustrate the concept of the present disclosure for those skilled in the art by referring to specific embodiments.

DETAILED DESCRIPTION

In order to make objectives, technical solutions and advantages of the embodiments of the present disclosure clearly, the technical solutions in the embodiments of the present disclosure are clearly and comprehensively described in the following with reference to the accompanying drawings in the embodiments of the present disclosure. It is apparent that the described embodiments are a part of, rather than all of, the embodiments of the present disclosure. All other embodiments obtained by those skilled in the art based on the embodiments of the present disclosure on the premise of not paying creative labor belong to the scope protected by the present disclosure.

First of all, terms involved in this application are explained as follow:

Storage device: refers to an external storage of a computer that can store data permanently, which is opposite to memory, such as disk, database, hard disk, and so on.

Location information set: refers to a set of location information of a storage space in which user data is stored. Location information may also be referred to as space allocation information, and may specifically include information of physical address, logical address, a mapping relationship between physical address and logical address, etc., which can be set according to actual needs.

Restarting a device: refers to a restart of a computer device including the above mentioned storage device.

Moreover, the terms "first", "second", and the like are used for the purpose of description only, and are not to be construed as indicating or implying a relative importance or implicitly indicating the number of technical features indicated. In the following description of the respective embodiments, the meaning of "a plurality" is two or more unless specifically defined otherwise.

The following several specific embodiments may be combined with each other, where the same or similar concepts or processes may not be described in some embodiments. Embodiments of the present disclosure will be described below with reference to the accompanying drawings.

A method for processing a data location of a storage device provided by an embodiment of the present disclosure may be applicable to storage device space management of a single computer device, and may also be applicable to data synchronization of a distributed system. The distributed system may include a master node and one or more slave nodes, where a processing apparatus (hereinafter referred to as an apparatus) storing a data location of a storage device may be disposed in a storage system for each node. When the master node receives a user's operation instruction (the operation instruction may include an operation type and user data to be operated, and the operation type includes writing, updating, etc.), the apparatus of the master node generates a first log (the first log may include the operation time of the operation and the user data of the operation) according to the user's operation instruction and based on the raft (log consistency) protocol, and transmits the first log to each slave node and the master node itself. Upon receiving the first log by each node (including the master node and each slave node), taking one of the nodes as an example, an apparatus of the node parses an user's operation instruction from the first log, and obtains space allocation information of user data from the memory, and generates a second log according to the space allocation information of the user data and information included in the first log, that is, the second log includes operation time, space allocation information of user data, and user data. The second log can be written to an area corresponding to the space allocation information of the user data in the storage device (such as a disk). The log of each user operation is written into the storage device for storage in real time, and thus, a user operation log is recorded in the storage device in real time. The space allocation information is written into the log for storage together with the user data, which effectively reduces the number of IOs, and solves the problem that the prior art tends to introduce additional IOs due to a separated storage of the space allocation information and the user data, thereby reducing the performance of the storage system.

Embodiment 1

The embodiment provides a method for processing a data location of a storage device, which is used to perform a corresponding processing on location information of data in the storage device. The execution subject of the embodiment is a processing apparatus of a data location in the storage device, where the apparatus can be disposed in a computer device including the storage device.

As show by FIG. 1, it is a schematic flowchart of a method for processing a data location of a storage device provided by the present embodiment, where the method includes:

Step 101: When a device is restarted, writing a first location information set of historical data stored in the storage device into a memory, where the historical data and location information corresponding to the historical data are stored in the storage device correspondingly, and the first location information set is used to represent a set of data location information.

Specifically, restarting a device refers to restarting a computer device including the above mentioned storage device. That is, the computer device needs to be restarted due to the reason of a fault, a normal shutdown, a human request to restart, and the like. When restarting, it is necessary to construct current complete location information in the memory, that is, space allocation information of all currently allocated storage spaces, where the storage device stores a first location information set of historical data. Optionally, the first location information set may be obtained by performing a snapshot or a backup processing, etc., on the current complete location information in the memory according to a certain trigger mechanism (for example, periodic) when the computer device is working normally, and be written to the storage device.

When the computer device works normally, the current complete location information is stored in the memory, and the space allocation information in the memory is dynamically updated, where the apparatus may preset a granularity allocation space, and store newly allocated space allocation information into the memory in real time, ensuring the integrity of space allocation information in memory. Therefore, when there is a new user operation, a storage location on new user data can be obtained from the memory, thereby writing the new user data into a corresponding storage location, or when there is a user reading existing data, a storage location of the data to be read by the user can also be obtained from the memory, so as to read data required to be read by the user at the corresponding storage location and give to user.

When restarting, the apparatus can read the first location information set from the storage device into the memory, but since the first location information set is generated when a trigger mechanism is reached before restarting, there may be update data to be stored in the storage device after the generation of the first location information; however, location information of this part of update data cannot be obtained from the first location information set. Therefore, other ways to obtain location information of update data is also required.

Historical data and its corresponding location information are stored in the storage device together, that is, the space allocation information is written into the log together with the user data for storage, thereby effectively reducing the number of IOs, and solving the problem in the prior art that a separated storing of space allocation information and user data tends to introduce additional IOs, decreasing the performance of a storage system.

Step 102: if there is update data in the storage device, writing location information of the update data stored corresponding to the update data in the storage device into the memory.

Specifically, since the first location information set is generated when a trigger mechanism is reached before restarting, there may be update data to be stored in the storage device after the generation of the first location information; however, location information of this part of update data cannot be obtained from the first location information set. Therefore, if there is update data in the storage device, writing location information of the update data stored corresponding to the update data in the storage device into the memory.

Optionally, when the computer device is working normally, a user operation log is recorded for each user data operation, and is stored in the storage device. That is, the user operation log includes operation information (specifically, it may include operation time information, location information of the historical data, and the historical data) that the historical data is written into the storage device described above, and includes operation information (specifically, it may include operation time information, location information of the update data, and the update data) that the update data is written into the storage device. Therefore, the location information of the update data can be obtained from the user operation log by log rollback (or log scan). The specific log rollback method is the technique in the prior art, which is not described in the present embodiment.

By combining the first location information set of the historical data with the location information of the update data obtained from the log, a complete location information can be quickly constructed in the memory, which not only ensures the integrity of space allocation information, but also improves a restart speed on the basis of reducing IOs.

Step 103: generating, according to the first location information set and the location information of the update data, a second location information set in the memory, and storing the second location information into the storage device.

Specifically, after obtaining the first location information set of the historical data and the location information of the update data, the second location information set may be generated in the memory according to the first location information set and the location information of the update data, that is, a complete location information is constructed in the memory, and thus location information of a corresponding storage location can be provided to a subsequent user operation at a fast speed. Meanwhile, the second location information set can be stored into the storage device, such as being stored into the storage device by means of snapshot or being stored into the storage device by means of backup and so on.

According to the method for processing a data location of a storage device, when a device is restarted, a first location information set of historical data stored in the storage device is write into a memory; if there is updated data in the storage device, location information of the updated data stored corresponding to the update data in the storage device is written into the memory; and a second location information set is generated in the memory according to the first location information set and the location information of the update data, and is stored in the storage device. By combining the first location information of the historical data and the location information of the update data obtained from the log, the complete location information can be constructed in the memory at a fast speed, thereby not only ensuring the integrity of space allocation information, but also improving restating speed on the basis of reducing IOs. By correspondingly storing the historical data and its corresponding location information in the storage device together, that is, the space allocation information is written into the log together with the user data for storage, thereby effectively reducing the number of IOs, and solving the problem in the prior art that a separated storing of space allocation information and user data tends to introduce additional IOs, thereby decreasing the performance of a storage system.

Embodiment 2

The present embodiment makes further supplementary illustration on the method for processing a data location of a storage device provided by Embodiment 1.

As an implementable manner, on the basis of the above mentioned Embodiment 1, optionally, the method may further include:

each time that set time is reached, generating an updated location information set according to current location information that has been existed in the memory, and storing the updated location information set into the storage device, where the current location information that has been existed in the memory includes current location information included in a position information set generated when the set time was reached at a previous time and current location information updated after the set time was reached at the previous time Specifically, a second location information set stored in the storage device can be updated periodically to generate a updated location information set, and stored into the storage device. That is, a trigger mechanism for updating the location information set is the time. Specifically, a certain time interval may be set, for example, updating one time every 5 minutes, updating one time every 10 minutes, and the like, where the specific time interval may be set according to actual needs, which is not limited in the present embodiment. It is updated one time each time the set time is reached. When the computer device works normally, current complete location information is stored in the memory in real-time, so that the updated location information set can be generated according to the current location information that has been existed in the memory and stored into the storage device. Where the current location information that has been existed in the memory includes current location information included in a position information set generated when the set time was reached at a previous time and current location information updated after the set time was reached at the previous time.

Optionally, for the updated location information set, all location information set generated each time may be stored in the storage device.

Optionally, in order to save storage space, only the latest updated location information set may be stored, that is, when updated location information set is generated, location information set that has been already stored in the storage device is replaced with the updated location information set.

By way of example, a second location information set is generated during restarting, and when the set time is reached for the first time, a first updated location information set is generated, then the first updated location information set may be stored into the storage device, while the second location information set is deleted, or the second location information set is overwritten directly. When the set time is reached for the second time, second updated location information set is generated, and then a second updated location information set is stored in the storage device, while the first updated location information set is released. The rest may be deduced by analogy for continuously updating.

Optionally, for each restart, a location information set that was updated for last time before the present restart is a first location information set that needs to be read from the storage device and written to the memory during the restart. The rest may be deduced by analogy for continuously updating, thereby ensuring the integrity of space allocation information.

As another implementable manner, on the basis of the above mentioned Embodiment 1, optionally, the method may further include:

if there is new data written into the storage device, generating an updated location information set according to current location information that has been existed in the memory, and storing the updated location information set into the storage device, where the current location information that has been existed in the memory includes location information before the new data is written and location information of the new data.

Specifically, a trigger mechanism for updating the location information set is that new data is written to the storage device, where a specific process of generating an updated location information set is similar to the above mentioned process of generating of a time trigger mechanism, and thus details are not repeated herein.

Optionally, a specific size or a number of writing times that new data is written can also be set so as to limit the trigger mechanism. For example, when it is determined that new data is written into the storage device, and the number of writing times is 5, an updated location information set is generated; when it is determined that new data is written into the storage device, and the size of the new data that is written exceeds a preset threshold, an updated location information set is generated and so on, which is not limited in the present embodiment.

In another implementable manner, based on the above mentioned Embodiment 1, optionally, the method may further include:

recording a user operation log, where the user operation log includes operation information that the historical data is written into the storage device, and operation information that the update data is written into the storage device.

Specifically, when the computer device is working normally, a user operation log is recorded for each user data operation, and is stored in the storage device. That is, the user operation log includes operation information (specifically, it may include operation time information, location information of the historical data, and the historical data) that the historical data is written into the storage device described above, and includes operation information (specifically, it may include operation time information, location information of the update data, and the update data) that the update data is written into the storage device. Therefore, the location information of the update data can be obtained from the user operation log by log rollback (or log scan). The specific log rollback method is the technique in the prior art, which is not described in the present embodiment.

Optionally, the operation information that the update data is written into the storage device includes operation time information, location information of the update data, and the update data; correspondingly, the writing location information on the updated data stored corresponding to the update data in the storage device into the memory, including:

scanning the operation information that the update data is written into the storage device in the user operation log, and writing location information on the update data into the memory.

Specifically, generation time of the first location information set and the operation time information can be compared to determine a time point after which a user operation log is update data, and thus determine the part of the user operation log that needs to scan.

Optionally, before the if there is updated data in the storage device, writing location information on the updated data stored corresponding to the update data in the storage device into the memory, the method further includes:

determining, according to a recorded log sequence number of the user operation log corresponding to the first location information set, whether there is update data in the storage device.

Specifically, each time a location information set (including a second location information set and each updated location information set) is generated, a log sequence number of the user operation log corresponding to the location information set is recorded, that is, recording a log sequence number before which location information generates a location information set, so that later on, when it is required to scan a log to obtain location information of update data, it is known which parts of the user operation log are to be scanned, that is, a log sequence number corresponding to a location information set can be used to distinguish historical data and update data. If a new log is generated after the log sequence number corresponding to the location information set in the user operation log, it proves that new data is written into the storage device.

Optionally, storing the second location information set into the storage device may specifically include: writing the second location information set into the storage device in a snapshot manner, that is, taking a snapshot of the second location information, and writing the snapshot into the storage device. Specific operations of the snapshot may be the technique in the prior art, which are not repeated herein.

Optionally, a location information set updated each time may be also written into the storage device in a snapshot manner, which is not repeated herein.

Optionally, each location information set may also be stored in other manners, for example, via backup. That is, when data is updated periodically or there is a certain amount of data to be updated, the current location information that has been existed is backed up, which also solves the problem in the prior art that a separated storing of space allocation information and user data tends to introduce additional IOs, thereby decreasing the performance of a storage system.

It should be noted that, in each embodiment of the present disclosure, the historical data and the update data are opposite. For the first location information set, taking a generation time point of the first location information set as a boundary line, then what before the generation time point is historical data, and what after the generation time point is update data. A first location information set obtained at the time of restarting is also an updated location information set generated for the last time before the restarting, and therefore, for each generation of a location information set (including a second location information set and an updated location information set), that is, historical data that is relative to the location information set is generated, and a log part which is then written into the storage device is a log corresponding to the update data.

The following description gives an exemplary illustration with a disk taken as an example: when a computer device receives an operation instruction from a user, for example, a write operation instruction, where the write operation instruction includes user data whose operation type is write and to be written, after an apparatus of the computer device obtains the write operation instruction, a first log is generated according to the raft protocol. The first log may include operation time information of the write operation for the present time and user data to be written. The apparatus obtains current space allocation information from the memory, that is, target location information corresponding to the user data to be written. The apparatus generates a second log according to location information corresponding to the user data to be written together with the operation time information and the user data to be written included in the first log, and write the second log into a storage area corresponding to the target location information. That is, the location information of the user data is recorded together with the user data as a user operation log and written into a disk. According to the above process, there is user data that is continuously written into, so that the user operation log in the disk is continuously updated. In the process of recording the user operation log, the current location information that has been existed in the memory is generated into a location information set (such as a second location information set or an updated location information set) according to a certain trigger mechanism (for example, periodically), in parallel. Location information set can be stored by means of snapshots, backups, etc., or current location information that has been existed in the memory is periodically snapshotted, where the snapshot is written to the disk. A log sequence number corresponding to a snapshot point (the time when the snapshot is taken) is recorded, that is, a log sequence number in the user operation log before which location information of the user data has been snapshot is recorded. Stored snapshots are continuously updated periodically, that is, the space allocation information of all allocated storage spaces at the time when the disk storage has a certain moment. If after the N-th snapshot, the computer device needs to be restarted due to various factors, space allocation information in the memory will be lost, then when the computer device restarts, a complete space allocation information needs to be reconstructed in the memory, and the apparatus can read the N-th snapshot from the disk, that is, to obtain the above mentioned first location information set, and location information of historical data. Since there may be a new user operation after the N-th snapshot, the apparatus may determine whether there is update data in the disk according to a log sequence number corresponding to the N-th snapshot. If there is a new log sequence number after the log sequence number corresponding to the Nth snapshot, that is, there is a new log, and it is determined that there is update data in the disk. The apparatus can scan the log or roll back the log, and stop scanning or rolling back the log sequence number portion corresponding to the N-th snapshot, thereby obtaining the location information of the update data.

After location information of the historical data and location information of the update data are obtained, complete spatial allocation information may be reconstructed in the memory according to the two location information, that is, to generate a second location information set. The second location information set can be snapshotted and then written to the disk. The above process is continued, where recording user operation log on the disk, while periodically snapshot current location information that has been existed in the memory and write it into the disk. Such operations are performed cyclical and are not repeated herein.

Figure 2:
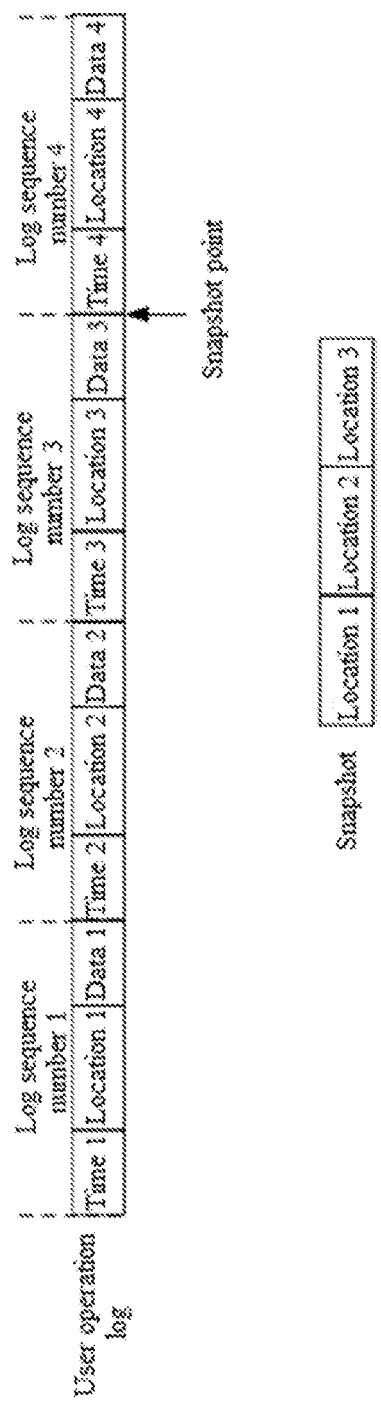
FIG. 2 is a schematic diagram of a corresponding relationship between a user operation log and a snapshot provided by another embodiment of the present disclosure.

As shown in FIG. 2, it is schematic diagram of a corresponding relationship between user operation log and snapshot provided by the present embodiment. Among them, the time is operation time information, the position is position information, and the data is user data, which have been simplified in the figure. A snapshot point is after log sequence number 3, indicating that the snapshot is taken to location information of user data corresponding to log sequence number 1-3. It may also record that the snapshot point corresponds to log sequence number 3. Of course, other manners can also be used for recording. It is only a schematic description and is not intended to be limiting. Other information such as user of the operation (user name, user number, etc.), type of the operation (write, read, etc.) can be also included in the operation log.

This is only an exemplary description. For a process from one restarting to another one, the trigger mechanism for generating an updated location information set or updating a snapshot may be any implementable mechanism, and may be set according to actual needs. The storage manner for location information set can also be snapshot, backup and other implementable manners.

It should be noted that the each of implementable manners that can be implemented in the present embodiment may be implemented separately, or may be combined in any combination in the case of no conflict, which is not limited by the present disclosure.

According to the method for processing a data location of a storage device, when a device is restarted, a first location information set of historical data stored in the storage device is write into a memory; if there is updated data in the storage device, location information of the updated data stored corresponding to the update data in the storage device is written into the memory; and a second location information set is generated in the memory according to the first location information set and the location information of the update data, and is stored in the storage device. By combining the first location information of the historical data and the location information of the update data obtained from the log, the complete location information can be constructed in the memory at a fast speed, thereby not only ensuring the integrity of space allocation information, but also improving restating speed on the basis of reducing IOs. By correspondingly storing the historical data and its corresponding location information in the storage device together, that is, the space allocation information is written into the log together with the user data for storage, thereby effectively reducing the number of IOs, and solving the problem in the prior art that a separated storing of space allocation information and user data tends to introduce additional IOs, thereby decreasing the performance of a storage system.

Embodiment 3

The embodiment provides an apparatus for processing a data location of a storage device, which is used to execute the method of Embodiment 1.

Figure 3:
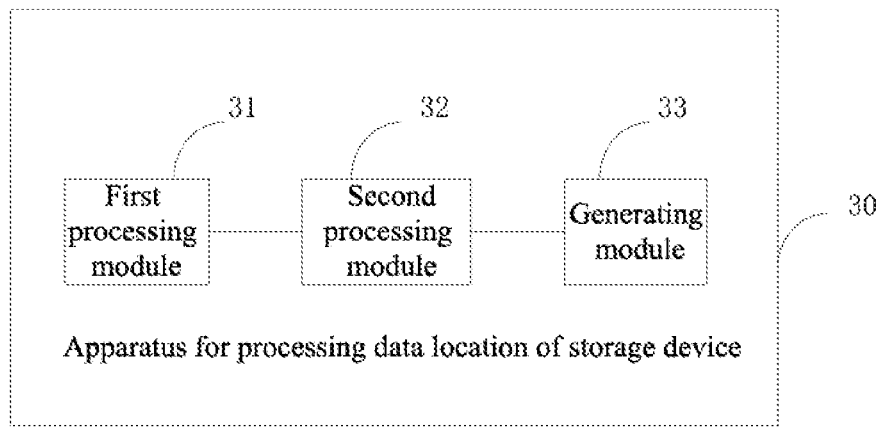
FIG. 3 is a schematic structural diagram of a device for processing a data location of a storage device provided by an embodiment of the present disclosure.

As shown in FIG. 3, it is a schematic structural diagram of an apparatus for processing a data location of a storage device provided the embodiment. The apparatus 30 for processing the data location of the storage device includes a first processing module 31, a second processing module 32, and a generation module 33.

The first processing module 31 is configured to when a device is restarted, write a first location information set of historical data stored in the storage device into a memory, where the historical data and location information corresponding to the historical data are stored in the storage device correspondingly, and the first location information set is used to represent a set of data location information; the second processing module 32 is configured to: if there is update data in the storage device, write location information of the update data stored corresponding to the update data in the storage device into the memory; the generating module 33 is configured to generate, according to the first location information set and the location information of the update data, a second location information set in the memory, and store the second location information into the storage device.

With regard to the apparatus in the present embodiment, specific manners in which the respective modules perform operations have been described in detail in the method embodiment, and thus will not be explained in detail herein.

According to the apparatus for processing a data location of a storage device provided by the embodiment, when a device is restarted, a first location information set of historical data stored in the storage device is write into a memory; if there is updated data in the storage device, location information of the updated data stored corresponding to the update data in the storage device is written into the memory; and a second location information set is generated in the memory according to the first location information set and the location information of the update data, and is stored in the storage device. By combining the first location information of the historical data and the location information of the update data obtained from the log, the complete location information can be constructed in the memory at a fast speed, thereby not only ensuring the integrity of space allocation information, but also improving restating speed on the basis of reducing IOs. By correspondingly storing the historical data and its corresponding location information in the storage device together, that is, the space allocation information is written into the log together with the user data for storage, thereby effectively reducing the number of IOs, and solving the problem in the prior art that a separated storing of space allocation information and user data tends to introduce additional IOs, thereby decreasing the performance of a storage system.

Embodiment 4

The present embodiment makes further supplementary illustration on the apparatus provided in the above mentioned Embodiment 3 to perform the method provided in Embodiment 2 above.

As an implementable manner, on the basis of the above mentioned Embodiment 3, optionally, the generating module is further configured to:

each time that set time is reached, generate an updated location information set according to current location information that has been existed in the memory, and store the updated location information set into the storage device, where the current location information that has been existed in the memory includes current location information included in a position information set generated when the set time was reached at a previous time and current location information updated after the set time was reached at the previous time.

As another implementable manner, on the basis of the above mentioned Embodiment 3, optionally, the generating module is further configured to:

if there is new data written into the storage device, generate an updated location information set according to current location information that has been existed in the memory, and store the updated location information set into the storage device, where the current location information that has been existed in the memory includes location information before the new data is written and location information of the new data.

In yet another implementable manner, on the basis of the above mentioned Embodiment 3, optionally, the second processing module is further configured to:

record a user operation log, where the user operation log includes operation information that the historical data is written into the storage device, and operation information that the update data is written into the storage device.

Optionally, operation information that the update data is written into the storage device includes operation time information, location information of the update data, and the update data;

correspondingly, the second processing module is specifically configured to:

scan the operation information that the update data is written into the storage device in the user operation log, and writing location information of the update data into the memory.

Optionally, the second processing module is further configured to:

determine, according to a recorded log sequence number of the user operation log corresponding to the first location information set, whether there is update data in the storage device.

Optionally, the generating module is specifically configured to:

take snapshot of the second location information set and write the snapshot into the storage device.

With regard to the apparatus in the present embodiment, specific manners in which the each of modules perform operations have been described in detail in the method embodiment, and thus will not be explained in detail herein.

It should be noted that each of the implementable manners in the present embodiment may be implemented separately, or may be combined in any combination in the case of no conflict, which is not limited by the present disclosure.

According to the apparatus for processing a data location of a storage device provided by the present embodiment, when a device is restarted, a first location information set of historical data stored in the storage device is write into a memory; if there is updated data in the storage device, location information of the updated data stored corresponding to the update data in the storage device is written into the memory; and a second location information set is generated in the memory according to the first location information set and the location information of the update data, and is stored in the storage device. By combining the first location information of the historical data and the location information of the update data obtained from the log, the complete location information can be constructed in the memory at a fast speed, thereby not only ensuring the integrity of space allocation information, but also improving restating speed on the basis of reducing IOs. By correspondingly storing the historical data and its corresponding location information in the storage device together, that is, the space allocation information is written into the log together with the user data for storage, thereby effectively reducing the number of IOs, and solving the problem in the prior art that a separated storing of space allocation information and user data tends to introduce additional IOs, thereby decreasing the performance of a storage system.

Embodiment 5

The present embodiment provides a computer device for implementing the method for processing a data location of a storage device according to the above mentioned embodiment.

Figure 4:
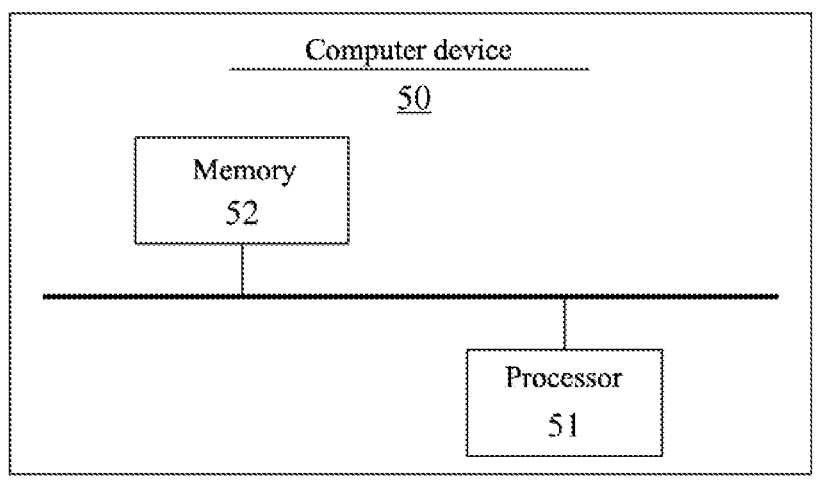
FIG. 4 is a schematic structural diagram of a computer device provided by an embodiment of the present disclosure.

As shown by FIG. 4, it is a schematic structural diagram of a computer device provided by the present embodiment. The computer device 50 includes: at least one processor 51 and a memory 52;

the memory stores a computer program; the at least one processor executes the computer program stored in the memory to implement the method for processing a data location of a storage device according to the above mentioned embodiments.

According to the computer device of the present embodiment, when a device is restarted, a first location information set of historical data stored in the storage device is write into a memory; if there is updated data in the storage device, location information of the updated data stored corresponding to the update data in the storage device is written into the memory; and a second location information set is generated in the memory according to the first location information set and the location information of the update data, and is stored in the storage device. By combining the first location information of the historical data and the location information of the update data obtained from the log, the complete location information can be constructed in the memory at a fast speed, thereby not only ensuring the integrity of space allocation information, but also improving restating speed on the basis of reducing IOs. By correspondingly storing the historical data and its corresponding location information in the storage device together, that is, the space allocation information is written into the log together with the user data for storage, thereby effectively reducing the number of IOs, and solving the problem in the prior art that a separated storing of space allocation information and user data tends to introduce additional IOs, thereby decreasing the performance of a storage system.

Embodiment 6

The present embodiment provides a computer readable storage medium, where the computer readable storage medium stores a computer program that, when the computer program being executed, implements the method provided by any one of the above mentioned embodiments.

According to the computer readable storage medium of the present embodiment, according to the computer device of the embodiment, when a device is restarted, a first location information set of historical data stored in the storage device is write into a memory; if there is updated data in the storage device, location information of the updated data stored corresponding to the update data in the storage device is written into the memory; and a second location information set is generated in the memory according to the first location information set and the location information of the update data, and is stored in the storage device. By combining the first location information of the historical data and the location information of the update data obtained from the log, the complete location information can be constructed in the memory at a fast speed, thereby not only ensuring the integrity of space allocation information, but also improving restating speed on the basis of reducing IOs. By correspondingly storing the historical data and its corresponding location information in the storage device together, that is, the space allocation information is written into the log together with the user data for storage, thereby effectively reducing the number of IOs, and solving the problem in the prior art that a separated storing of space allocation information and user data tends to introduce additional IOs, thereby decreasing the performance of a storage system.

In the several embodiments provided by the present disclosure, it should be understood that the disclosed apparatus and method may be implemented in other manners. For example, the apparatus embodiments described above are merely illustrative. For example, the division of units is only a division of logical functions. In actual implementation, there may be other division manners, for example, multiple units or components may be combined or integrated into another system, or some features can be ignored or not executed. In addition, the mutual coupling or direct coupling or communicative connection shown or discussed may be an indirect coupling or communicative connection via some interfaces, apparatuses or units, and may be in an electrical, mechanical or other form.

The units described as separate components may or may not be physically separated, and the components displayed as units may or may not be physical units, that is, they may be located in one site, or may be distributed across multiple network units. Some or all of the units may be selected according to actual needs to achieve the purpose of the solution of the embodiments.

In addition, each functional unit in each embodiment of the present disclosure may be integrated into a processing unit, or may be presented as each unit that are separated physically, or two or more units may be integrated into one unit. The above integrated units may be implemented in the form of hardware or in the form of hardware plus software functional units.

The above mentioned integrated units implemented in the form of software functional units may be stored in a computer readable storage medium. The software functional unit described above is stored in a storage medium and includes several instructions for causing a computer device (which may be a personal computer, a server, or a network device, etc.) or a processor to perform part of the steps of the methods described in various embodiments of the present disclosure. The above mentioned storage medium includes medium that is capable of storing program codes, such as a USB flash disc, a mobile hard disk, a read-only memory (ROM), a random access memory (RAM), a magnetic disk, or a compact disk, and the like.

Those skilled in the art should understand that for the purpose of convenience and brevity, only the division of each functional module described above is illustrative. In practical applications, the above functions may be assigned to different functional modules for implementation as needed, that is, the internal structure of the apparatus is divided into different functional modules to perform all or part of the functions described above. For the specific working process of the apparatus described above, reference may be made to the corresponding process in the above mentioned method embodiments, and details are not repeated herein.

At last, it should be noted that the above embodiments are merely illustrative of the technical solutions of the present disclosure, and are not intended to be limiting. Although the present disclosure has been described in detail with reference to the above mentioned various embodiments. Those of ordinary skill in the art will understand that the technical solutions described in the above mentioned embodiments may still be modified, or that some or all of the technical features may be equivalently substituted; and these modifications or substitutions do not deviate the nature of the corresponding technical solution from the scope of the technical solutions of various embodiments according to the present disclosure.

What is claimed is:

1. A method for processing a data location of a storage device, comprising:
   writing a first location information set of historical data stored in the storage device into a memory when a device is restarted, wherein the historical data and location information corresponding to the historical data are stored in a same log in the storage device correspondingly, and the first location information set is used to represent a set of data location information;
   writing location information of update data stored corresponding to the update data in the storage device into the memory if there is the update data in the storage device;
   generating, according to the first location information set and the location information of the update data, a second location information set in the memory, and storing the second location information into the storage device; and
   in response to a trigger condition being reached, generating an updated location information set according to current location information that existed in the memory, and storing the updated location information set into the storage device, wherein the trigger condition comprises that a number of writing operations occurred exceeds a predetermined threshold, and wherein the current location information that existed in the memory comprises location information before the trigger condition is reached and location information of new data.

2. The method according to claim 1, wherein the method further comprises:
   each time that a set time is reached, generating an updated location information set according to current location information that existed in the memory, and storing the updated location information set into the storage device, wherein the current location information that existed in the memory comprises current location information comprised in a position information set generated when the set time was reached at a previous time and current location information updated after the set time was reached at the previous time.

3. The method according to claim 1, wherein the method further comprises:
   if there is new data written into the storage device, generating an updated location information set according to current location information that existed in the memory, and storing the updated location information set into the storage device, wherein the current location information that existed in the memory comprises location information before the new data is written and location information of the new data.

4. The method according to claim 1, wherein the method further comprises:
   recording a user operation log, wherein the user operation log comprises operation information that the historical data is written into the storage device, and operation information that the update data is written into the storage device.

5. The method according to claim 4, wherein the operation information that the update data is written into the storage device comprises operation time information, location information of the update data, and the update data;
   correspondingly, the writing location information of the update data stored corresponding to the update data in the storage device into the memory, comprising:
   scanning the operation information that the update data is written into the storage device in the user operation log, and writing location information of the update data into the memory.

6. The method according to claim 5, wherein before the writing location information of the update data stored corresponding to the update data in the storage device into the memory, the method further comprises:
   determining, according to a recorded log sequence number of the user operation log corresponding to the first location information set, whether there is update data in the storage device.

7. The method according to claim 1, wherein storing the second location information set into the storage device comprises:
   taking a snapshot of the second location information set and writing the snapshot into the storage device.

8. The method according to claim 1, wherein the trigger condition further comprises that a size of new data that is written exceeds a predetermined threshold.

9. An apparatus for processing a data location of a storage device, comprising at least one processor and a memory; wherein:
   the memory stores a computer program; and
   the at least one processor, when executing the computer program, is configured to:
   write a first location information set of historical data stored in the storage device into a memory when a device is restarted, wherein the historical data and location information corresponding to the historical data are stored in a same log in the storage device correspondingly, and the first location information set is used to represent a set of data location information;
   write location information of update data stored corresponding to the update data in the storage device into the memory if there is the update data in the storage device;
   generate, according to the first location information set and the location information of the update data, a second location information set in the memory, and store the second location information into the storage device; and
   in response to a trigger condition being reached, generate an updated location information set according to current location information that existed in the memory, and store the updated location information set into the storage device, wherein the trigger condition comprises that a number of writing operations occurred exceeds a predetermined threshold, and wherein the current location information that existed in the memory comprises location information before the trigger condition is reached and location information of new data.

10. The apparatus according to claim 9, wherein the processor is further configured to:
each time that a set time is reached, generate an updated location information set according to current location information that existed in the memory, and store the updated location information set into the storage device, wherein the current location information that existed in the memory comprises current location information comprised in a position information set generated when the set time was reached at a previous time and current location information updated after the set time was reached at the previous time.

11. The apparatus according to claim 9, wherein the processor is further configured to:
if there is new data written into the storage device, generate an updated location information set according to current location information that existed in the memory, and store the updated location information set into the storage device, wherein the current location information that existed in the memory comprises location information before the new data is written and location information of the new data.

12. The apparatus according to claim 9, wherein the processor is further configured to:
record a user operation log, wherein the user operation log comprises operation information that the historical data is written into the storage device, and operation information that the update data is written into the storage device.

13. The apparatus according to claim 12, wherein the operation information that the update data is written into the storage device comprises operation time information, location information of the update data, and the update data;
correspondingly, the processor is configured to:
scan the operation information that the update data is written into the storage device in the user operation log, and writing location information of the update data into the memory.

14. The apparatus according to claim 12, wherein the processor is further configured to:
determine, according to a recorded log sequence number of the user operation log corresponding to the first location information set, whether there is update data in the storage device.

15. The apparatus according to claim 9, wherein the processor is configured to:
take snapshot of the second location information set and write the snapshot into the storage device.

16. A non-volatile computer readable storage medium, wherein the non-volatile computer readable storage medium stores a computer program that, when the computer program is executed, implements the following:
writing a first location information set of historical data stored in the storage device into a memory when a device is restarted, wherein the historical data and location information corresponding to the historical data are stored in a same log in the storage device correspondingly, and the first location information set is used to represent a set of data location information;
writing location information of update data stored corresponding to the update data in the storage device into the memory if there is the update data in the storage device;
generating, according to the first location information set and the location information of the update data, a second location information set in the memory, and storing the second location information into the storage device; and
in response to a trigger condition being reached, generating an updated location information set according to current location information that existed in the memory, and storing the updated location information set into the storage device, wherein the trigger condition comprises that a number of writing operations occurred exceeds a predetermined threshold, and wherein the current location information that existed in the memory comprises location information before the trigger condition is reached and location information of new data.

17. The non-volatile computer readable storage medium according to claim 16, wherein the non-volatile computer readable storage medium stores the computer program that, when the computer program is executed, further implements the following:
each time that set time is reached, generating an updated location information set according to current location information that existed in the memory, and storing the updated location information set into the storage device, wherein the current location information that existed in the memory comprises current location information comprised in a position information set generated when the set time was reached at a previous time and current location information updated after the set time was reached at the previous time.

18. The non-volatile computer readable storage medium according to claim 16, wherein the non-volatile computer readable storage medium stores the computer program that, when the computer program is executed, further implements the following:
if there is new data written into the storage device, generating an updated location information set according to current location information that existed in the memory, and storing the updated location information set into the storage device, wherein the current location information that existed in the memory comprises location information before the new data is written and location information of the new data.

19. The non-volatile computer readable storage medium according to claim 16, wherein the non-volatile computer readable storage medium stores the computer program that, when the computer program is executed, further implements the following:
recording a user operation log, wherein the user operation log comprises operation information that the historical data is written into the storage device, and operation information that the update data is written into the storage device.

20. The non-volatile computer readable storage medium according to claim 19, wherein the operation information that the update data is written into the storage device comprises operation time information, location information of the update data, and the update data;
correspondingly, wherein the non-volatile computer readable storage medium stores the computer program that, when the computer program is executed, further implements the following:

scanning the operation information that the update data is written into the storage device in the user operation log, and writing location information of the update data into the memory.

* * * * *